United States Patent [19]

Kurosawa et al.

[11] 4,282,570
[45] Aug. 4, 1981

[54] METHOD AND APPARATUS FOR CONTROLLING AN OUTPUT CURRENT OF A CONTROLLED RECTIFIER

[75] Inventors: Ryoichi Kurosawa, Tokyo; Toshiaki Kudor, Inagi, both of Japan

[73] Assignee: Tokyo Shibaura Denki Kabushiki Kaisha, Kanagawa, Japan

[21] Appl. No.: 142,458

[22] Filed: Apr. 21, 1980

[30] Foreign Application Priority Data

Apr. 26, 1979 [JP] Japan .................................. 54-51620

[51] Int. Cl.³ .......................................... H02P 13/26
[52] U.S. Cl. ........................................ 363/87; 363/37
[58] Field of Search ................... 318/722; 363/34, 37, 363/84, 85, 87, 129

[56] References Cited

U.S. PATENT DOCUMENTS

| | | | |
|---|---|---|---|
| 3,582,755 | 6/1971 | Liss et al. | 363/87 X |
| 3,748,556 | 7/1973 | Gillett | 363/34 |
| 3,883,791 | 5/1975 | Zelina et al. | 363/87 |
| 3,939,387 | 2/1976 | Maeda | 363/34 X |
| 4,066,938 | 1/1978 | Turnbull | 363/37 X |
| 4,210,956 | 7/1980 | Watanabe | 363/37 X |

OTHER PUBLICATIONS

IEEE Transactions on IECI vol. IECI-26, No. 3, Aug. 1979, p. 161, Analog-to-Digital Conversion Based on a Voltage-to-Frequency Converter.

*Primary Examiner*—William M. Shoop
*Attorney, Agent, or Firm*—Stevens, Davis, Miller & Mosher

[57] ABSTRACT

In a method and apparatus for controlling an output current of a controlled rectifier connected to an AC power supply, by firing angle control of the controlled rectifier in accordance with the result of comparison of a value corresponding to the rectifier output current with a predetermined reference value, an average value of a detected rectifier output current over a period having a length equal to an integer multiple of the average period of the firing angle control is calculated, and a signal for firing the controlled rectifier is produced at an angle determined in accordance with comparison of the calculated average value with the reference value.

11 Claims, 12 Drawing Figures

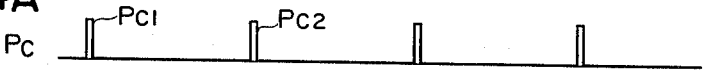
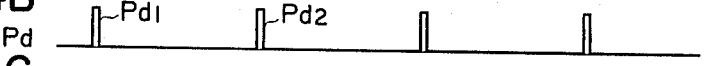
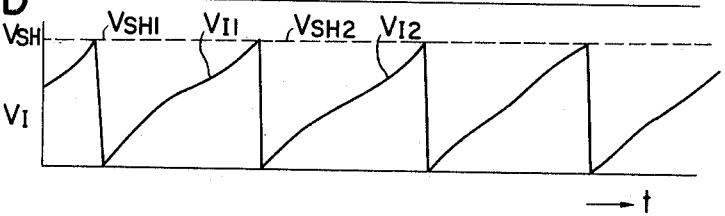
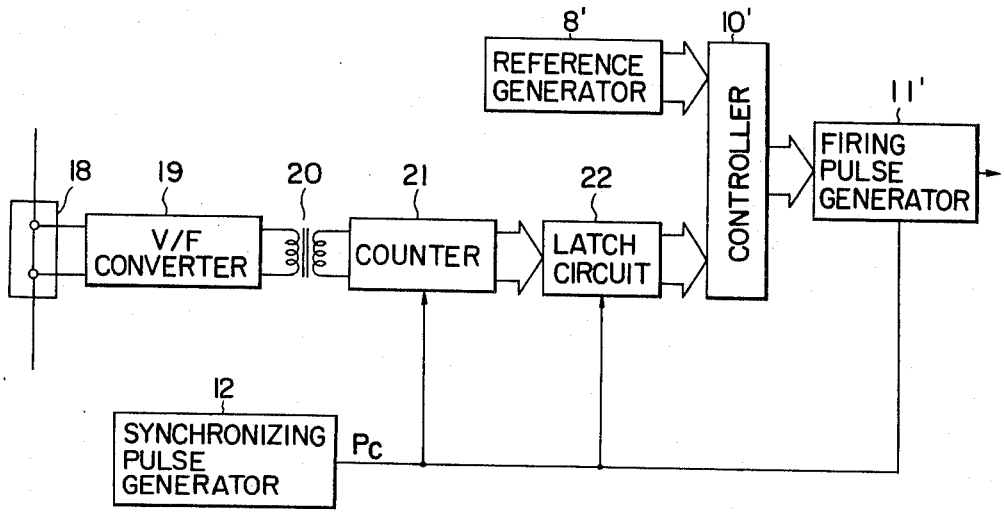

4,282,570

METHOD AND APPARATUS FOR CONTROLLING AN OUTPUT CURRENT OF A CONTROLLED RECTIFIER

BACKGROUND OF THE INVENTION

The present invention relates to a method and apparatus for controlling an output current of a controlled rectifier by means of phase control.

As an example of an AC motor system with a speed variable drive system using a controlled rectifier, a brushless motor system has been known. As illustrated in FIG. 1, an example of brushless motor system comprises a controlled rectifier 2 connected to a three-phase AC power supply 1, a DC reactor for smoothing the ripple in the DC output from the controlled rectifier 2, an inverter 4 for converting the DC output from the controlled rectifier 2 into an AC output of a desired frequency. The output of the inverter 4 is fed to a three-phase synchronous motor 5 for driving the same. The angular position of the motor 5 is detected by an angular position detector 6. A pulse generator 7 produces, responsive to the output of the detector 6, gate signals for each of the thyristors of the inverter 4. A reference value $I_o$ of the rectifier output current is given by a reference generator 8. The output current $I_{dc}$ of the rectifier 2 is detected by a current detector 9. The reference value $I_o$ and the detected current $I_{dc}$ are compared with each other and a control signal is produced in accordance with the result of the comparison at the controller 10, i.e., the difference $\Delta I = I_o - I_{dc}$. The control signal from the comparator 10 is fed to a firing pulse generator 11 which applies gate signals to each of the thyristers of the controlled rectifier 2 at angles determined in accordance with the output of the controller 10. A synchronizing pulse generator 12 detects the output of the power supply 1 and supplies a synchronizing pulse $P_c$ at an interval of the average firing period to the firing pulse generator for ensuring synchronism.

The system shown in FIG. 1 has the following problems. When the frequency of the output of the motor 5 is close to the frequency of the power supply 1, a current beat of a frequency related to the difference between the power supply frequency and the inverter output frequency occurs.

More particularly, assume that the motor frequency is constant and close to the power supply frequency and the firing angle of the controlled rectifier 2 is fixed. The DC output voltage $V_{dc1}$ of the controlled rectifier 2 and the input voltage $V_{dc2}$ of the inverter 4 are as shown in FIGS. 2A and 2B, respectively. Accordingly, the voltage $V_{dcL}$ across the reactor 3 is as shown in FIG. 2C. The reactor 3 is provided to accommodate or "absorb" the voltage difference. The reactance of the reactor 3 is selected to be as small as possible for economy and for shorter response time in current control. As a result, pulsation (hereinafter referred to as current ripple) with a frequency equal to the firing frequency (six times the power supply frequency) appears in the current $I_{dc}$, as illustrated in FIG. 2D, and the current ripple of the current $I_{dc}$ is amplitude-modulated at a frequency six times the difference between the power supply frequency and the motor frequency. The average value of the current $I_{dc}$ is substantially constant. Therefore, if the motor 5 is driven by an AC current corresponding to the current $I_{dc}$, the average torque is constant, i.e., although pulsation corresponding to the firing frequency occurs, pulsation or variation at a lower frequency does not occur, so that there is no problem in current control. Thus, as far as the firing angle is constant there is no problem. However, when the rectifier output current is fed back to effect current control, the ripple component of the load current is included in the output of the controller 10 which is supplied to the firing pulse generator 11 as a firing angle reference and hence a different phenomenon occurs. This phenomenon is explained below.

To simplify the explanation, it is assumed that the controller 10 is of a proportional control type, the current reference is constant, and the firing angle is constant. The output $\Delta I$ of the controller 10 is a difference between the constant current reference $I_o$ and the detected current $I_{dc}$, so that the wave form of the output $\Delta I$ is, as shown in FIG. 2E, substantially an inversion of the current $I_{dc}$. The broken line in FIG. 2E indicates the instantaneous values of the output $\Delta I$ at the instances when the firing pulses are given. The instantaneous values indicated by the broken line are related to the firing angle. Thus, the assumption that the firing angle is constant is revealed to be incorrect. In reality, the firing angle varies when a feedback control is carried out. The variation in the firing angle is related in magnitude to the current ripple and has a frequency six times that of the difference between the power supply frequency and the motor frequency. As a result, the average value of the rectifier output current also has a pulsation, i.e., current beat of the same frequency.

In order to prevent the effect of the load current beats on the output of the controller 10 incorporation of a low-pass filter in the control system may be conceived. However, incorporation of a low-pass filter prolongs the response time, and hence should be avoided.

Another problem is that it is difficult to make the conventional current control system of digital data processing devices. One recent trend in automatic control is to change from analog data processing to digital data processing. This is because the digital techniques such as microcomputer techniques have developed, the digital data processing can now be carried out easily and economically by the use of a microcomputer or the like, use of digital data processing reduces the number of elements or parts which require adjustment and improves reliability, and the current reference is often given in a digital form where the control system is used in a large scale system such as a steel production line and the large scale system is under control of a computer system.

If the controller and the firing angle generator are made of digital devices by, for example, the use of a microcomputer, the load current value has to be digitized before it is supplied to the current control circuit. To fully reproduce the wave form of the rectifier output current, the sampling must be made at a high frequency. Also, the program for carrying out the sampling is complicated, and substantial time is required to execute the program. These facts may lead to reduction of time for operation of comparison and firing pulse generation. Thus, it will be appreciated that there are difficulties in making the conventional current control system of digital data processing devices.

SUMMARY OF THE INVENTION

An object of the invention is to provide a method and apparatus for controlling an output current of a controlled rectifier which is capable of restraining, without prolonging response time, current beats which tend to occur when the controlled rectifier is used as a part of a brushless motor system.

Another object of the invention is to provide a method and apparatus for controlling a current of a controlled rectifier with which control can be achieved by digital data processing.

According to one aspect of the invention there is provided a method for controlling an output current of a controlled rectifier connected to an AC power supply, by firing angle control of the controlled rectifier in accordance with the result of comparison of a value corresponding to the rectifier output current with a predetermined reference value, comprising the steps of:

detecting the rectifier output current, calculating an average value of the rectifier output current over a period having a length equal to an integer multiple of the average period of the firing angle control, comparing the average value of the rectifier output current with the reference value, and producing a signal for firing the controlled rectifier at an angle determined in accordance with the result of the comparison.

According to another aspect of the invention, there is provided apparatus for controlling an output current of a controlled rectifier connected to an AC power supply, by firing angle control of the controlled rectifier in accordance with the result of comparison of a value corresponding to the rectifier output current with a predetermined reference value, comprising:

means for detecting the rectifier output current, means for calculating an average value of the rectifier output current over a period having a length equal to an integer multiple of the average period of the firing angle control, means for comparing the average value of the rectifier output current with the reference value, and means for producing a signal for firing the controlled rectifier at an angle determined in accordance with the result of the comparison.

BRIEF DESCRIPTION OF THE DRAWINGS

In the accompanying drawings:

FIGS. 4A through 4D are diagrams showing wave forms at various parts of the apparatus shown in FIG. 3; and FIG. 5 is a block diagram showing another embodiment of the invention.

DETAILED DESCRIPTION OF THE EMBODIMENTS

Figure 1:
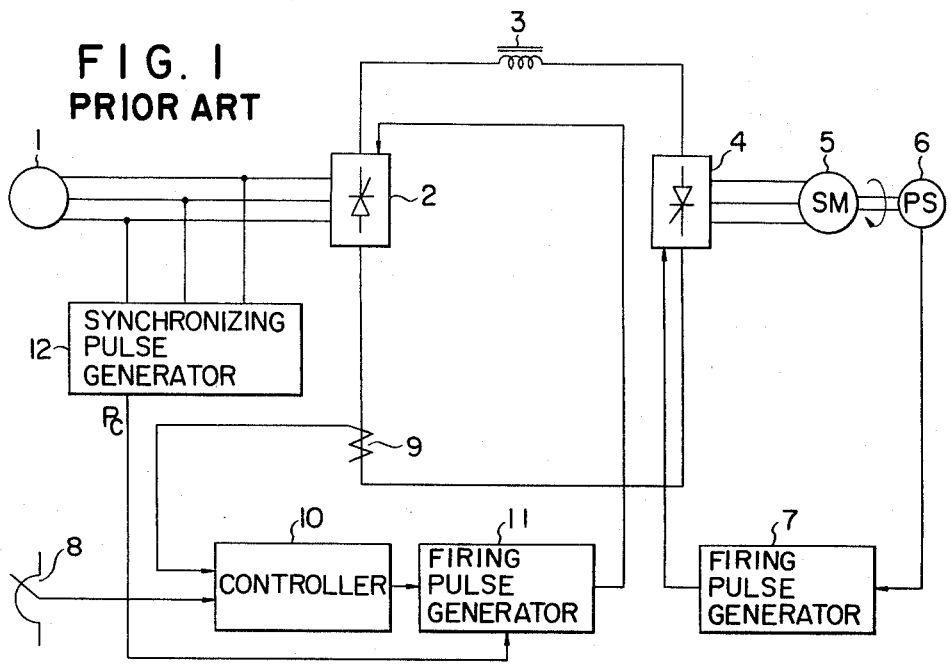
FIG. 1 is a block diagram showing a brushless motor system with a conventional current control system.
Figure 3:
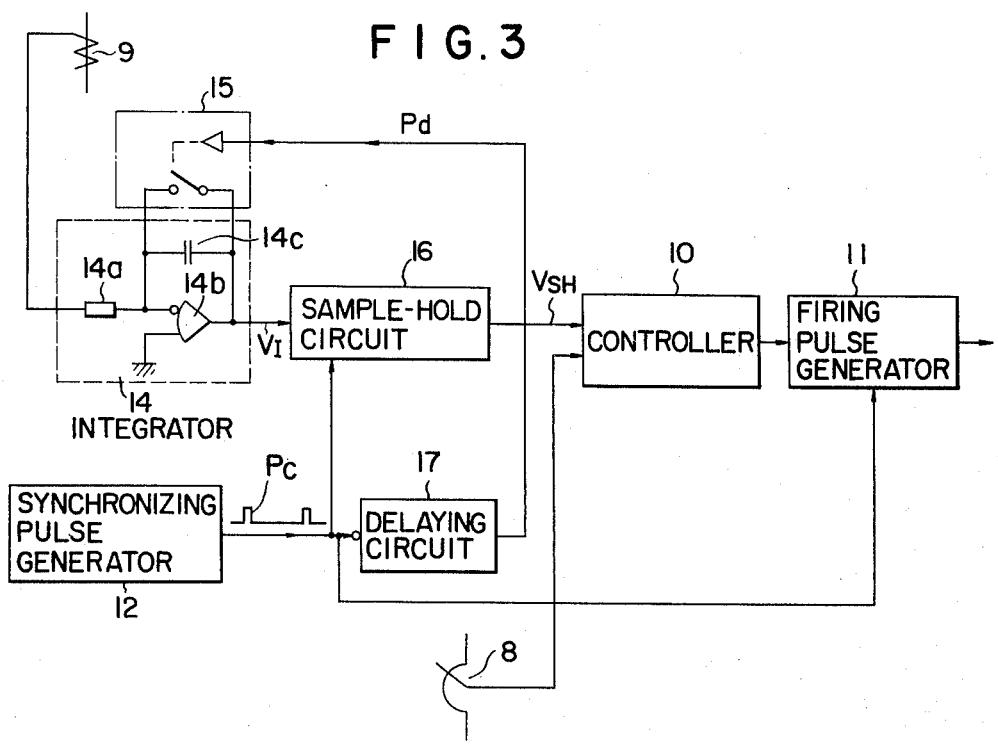
FIG. 3 is a block diagram showing an embodiment of the invention.
Figure 2A:
FIGS. 2A through 2E are diagrams showing the wave forms of voltages and currents at various parts of the system shown in FIG. 1.
Figure 2B:
Figure 2C:
Figure 2D:
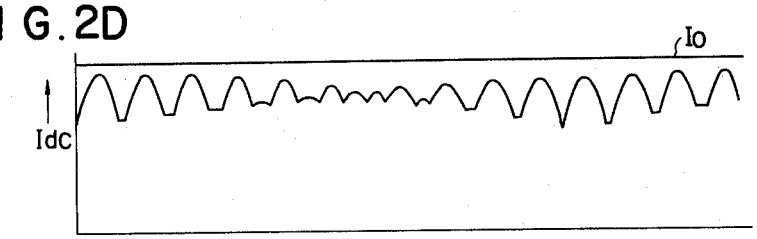
Figure 2E:
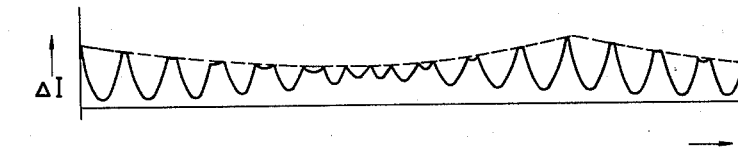

FIG. 3 shows an embodiment of a system for controlling an output current of a controlled rectifier according to the present invention. In FIG. 3, the members 8, 9, 10, 11 and 12 are substantially the same as those indicated by the same numerals in FIG. 1. According to the invention, there is provided an integrator 14 formed of a resistor 14a, an amplifier 14b and a capacitor 14c. The integrator 14 is used to integrate the instantaneous value of the current detected by the current detector 9 to produce a signal indicative of the average value of the rectifier output current over the average firing period.

An analog switch 15 is provided to discharge, when actuated by a delayed signal $P_d$ which will be described later, the capacitor 14c for resetting the integrator 14 to a state in which the integrator output is zero. As the analog switch 15, an integrated circuit such as Type AD 7510 supplied by Analog Devices, Inc. of U.S.A. can be used. A sample-hold circuit 16 samples, when it receives a synchronizing pulse $P_c$ from the synchronizing pulse generator 12, the output of the integrator 14 and holds the sampled data until the subsequent sampling. As a sample-hold circuit 16, an integrated circuit such as Type AD 582 supplied by Analog Devices, Inc. can be used.

A delaying circuit 17, which may comprise a monostable multivibrator 17, receives the synchronizing pulse $P_c$ and produces a delayed pulse $P_d$.

The synchronizing pulse $P_c$ is periodically supplied at an interval equal to the average firing period, i.e., one sixth of the period of the power supply where a three phase full wave rectifier is used.

FIG. 4A shows the synchronizing pulses $P_{c1}$, $P_{c2}$, ... . FIG. 4B shows the delayed pulses $P_{d1}$, $P_{d2}$, ... produced by the delaying circuit 17. FIG. 4C shows a rectifier output current $I_{dc}$. FIG. 4D shows an output $V_I$ of the integrator 14 (input of the sample-hold circuit 16) by a solid line and an output $V_{SH}$ of the sample-hold circuit 16 by a broken line.

The output of the current detector 9 which is proportional to the rectifier output current $I_{dc}$ (FIG. 4C) is integrated by the integrator 14 and the output thereof is applied to the sample-hole circuit 16. The sample-hold circuit 16 samples, when it receives the synchronizing pulse $P_{c1}$, the output $V_{I1}$ of the integrator 14 and holds the sampled value $V_{I1}$ until the receipt of the subsequent control pulse $P_{c2}$.

The integrator 14 is reset by the delayed pulse $P_{d1}$ (FIG. 4B) and recommences integration.

The output $V_{SH1}$ of the sample-hold circuit 16 is maintained constant until the subsequent synchronizing pulse $P_{c2}$ as shown by the broken line in FIG. 4D.

The comparator 10 compares the output of the sample-hold circuit 16 with the reference value from the reference generator 8, and the firing pulse generator 11 produces a firing pulse at an angle determined in accordance with the result of the comparison.

The subsequent synchronizing pulse $P_{c2}$ causes the sample-hold circuit 16 to sample the integrator output $V_{I2}$ at this instance and hold this value in place of the previously sampled value.

Since the rectifier output current $I_{dc}$ has ripples, the integrator output $V_I$ has a different wave form every cycle. But as the average value of the load current $I_{dc}$ over one cycle is substantially constant so that the integrator output at the end of each cycle is also substantially constant. As a result, the output $V_{SH}$ of the sample-hold circuit 16 is, as indicated by the broken line in FIG. 4D, maintained substantially constant.

It will therefore be appreciated that if the output $V_{SH}$ is fed back to the controller 10 as a feed back value of the rectifier output current $I_{dc}$, the output $\Delta I$ of the controller 10 will have not current ripple component. Consequently, if the current reference is fixed, the firing angle is maintained constant and hence current beats are prevented.

Any variation in the average value of the rectifier output current $I_{dc}$ is reflected in the output $V_{SH}$ of the sample-hold circuit 16 after integration over one cycle, and the firing angle control during the subsequent cycle is made in accordance with such output $V_{SH}$, so that the response time in current control is sufficiently short.

As was noted in the background of the invention, it is difficult to make the conventional current control system of digital data processing devices. In contrast, according to this invention it is only necessary to sample the output $V_{SH}$ of the sample-hold circuit 17 once every cycle of the controlled rectifier firing. Thus, the required sampling frequency is relatively low. For this reason, the current control system according to the present invention can be readily made of digital data processing devices.

FIG. 5 shows another embodiment of the invention in which various members are formed of digital data processing devices. A current detector 18 is in the form of a shunt which produces a voltage corresponding to the instantaneous value of the rectifier output current $I_{dc}$. A voltage to frequency converter (V/F converter) 19 produces pulses of a frequency corresponding to the output voltage of the current detector 18. The output pulses of the V/F converter 19 is interrupted, through a pulse transformer 20, which provides insulation, to a counter 21 which counts the number of pulses. A latch circuit formed of delay type (D type) flip-flop circuit takes in or reads, when a synchronizing pulse $P_c$ is given, the counter 21 and holds the counter output so taken in. The synchronizing pulse $P_c$ is also used to reset the counter 21. Although the same synchronizing pulse $P_c$ is used for the latching operation of the latch circuit 22 and for the resetting of the counter 21, there is a delay before the counter 21 is actually reset after the synchronizing pulse $P_c$ is given, so that the latch circuit 22 has time to take in or read the counter output.

A digital controller 10' compares the output of the latch circuit 22 with a digital reference value from a digital reference generator 8'. A firing pulse generator 11' produces a firing pulse at an angle determined in accordance with the result of the comparison.

It will be appreciated that the embodiment of FIG. 3 handles the signal in analog form while the embodiment of FIG. 5 handles the digital signal of a frequency proportional to the output signal of the current detector, and the counter 21 and the latch circuit 22 of FIG. 3 respectively correspond to the integrator 14 and the sample-hold circuit 16, and hence the embodiment of FIG. 5 performs virtually the same function as the embodiment of FIG. 3.

With the embodiment shown in FIG. 5, the average value of the rectifier output current $I_{dc}$ is obtained as a digital value, and insulation is readily provided by the insulation pulse transformer 20, i.e., without resorting to an expensive DC current transformer or an insulation amplifier.

Moreover, if a microcomputer such as the Type Intel 8748 (supplied by Intel Corporation) which has both functions as a counter and as a latch circuit, is used the construction of the current control system is further simplified.

As has been described, time over which integration or counting is continued is selected to avoid current beats, i.e., to be an integer multiple of the period of phase control. Therefore, current control is not affected by the ripple of the load current, and the response time is sufficiently short. Restrictions due to current beats imposed by the use of the controlled rectifier in an AC motor control system such as a brushless motor system are eliminated. And the control system can be readily formed of digital data processing devices.

It should be noted that the embodiments shown in FIG. 3 and FIG. 5 can be modified in various ways. For example, the digital reference generator 8', the digital controller 10' and the digital firing pulse generator 11' in FIG. 5 may be replaced by an analog comparator and an analog firing pulse generator, in which case a digital-to-analog converter should be inserted between the latch circuit 22 and the analog comparator.

Where a speed control system of the driven motor is added, the current control system is an important fundamental element as a minor loop, and the performance of the current control system has a great effect on the overall control. Because the current control system according to the present invention is free from current beats and has sufficiently short response time great advantages are gained in the overall control of the motor.

What is claimed is:

1. A method for controlling an output current of a controlled rectifier connected to an AC power supply, by firing angle control of the controlled rectifier in accordance with the result of comparison of a value corresponding to the rectifier output current with a predetermined reference value, comprising the steps of:
   detecting the rectifier output current,
   calculating an average value of the rectifier output current over a period having a length equal to an integer multiple of the average period of the firing angle control,
   comparing the average value of the rectifier output current with the reference value, and
   producing a signal for firing the controlled rectifier at an angle determined in accordance with the result of the comparison.

2. A method according to claim 1, wherein said step of detecting comprises detecting an instantaneous value of the rectifier output current.

3. A method according to claim 2, wherein said step of calculating comprises integrating the instantaneous value of the rectifier output current over a period having a length equal to an integer multiple of the average period of the firing angle control to produce a signal indicative of the average value.

4. A method according to claim 2, wherein said step of calculating comprises:
   converting the instantaneous value of the rectifier output current into pulses having a frequency corresponding to the instantaneous value, and
   counting the number of the pulses over a period having a length equal to an integer multiple of the average period of the firing angle control to produce a signal indicative of the average value.

5. Apparatus for controlling an output current of a controlled rectifier connected to an AC power supply, by firing angle control of the controlled rectifier in accordance with the result of comparison of a value corresponding to the rectifier output current with a predetermined reference value, comprising:
   means for detecting the rectifier output current,
   means for calculating an average value of the rectifier output current over a period having a length equal to an integer multiple of the average period of the firing angle control,
   means for comparing the average value of the rectifier output current with the reference value, and means for producing a signal for firing the controlled rectifier at an angle determined in accordance with the result of the comparison.

6. Apparatus according to claim 5, wherein said means for detecting comprises means for detecting the instantaneous value of the rectifier output current.

7. Apparatus according to claim 6, further comprising a synchronizing pulse generator connected to the AC power supply for generating a synchronizing pulse at an interval of the average firing period.

8. Apparatus according to claim 7, wherein said means for calculating comprises an integrator for integrating the detected instantaneous value to produce a signal indicative of the average value, and wherein said apparatus further comprises a delaying circuit responsive to the synchronizing pulse for producing a delayed pulse, and means responsive to the delayed pulse for resetting the integrator to a state in which the output of the integrator is zero.

9. Apparatus according to claim 8, further comprising a sample-hold circuit for sampling the output of the integrator when the synchronizing pulse is generated and for holding the integrator output so sampled until the subsequent generation of the synchronizing pulse, wherein said means for comparing comprises means for comparing the output of the sample-hold circuit with the reference value.

10. Apparatus according to claim 7, further comprising converting means for converting the instantaneous value of the rectifier output current into pulses having a frequency corresponding to the instantaneous value, wherein said means for calculating comprises a counter connected to be reset by the synchronizing pulse and connected to the converting means for counting the number of pulses from the converting means until the subsequent generation of the synchronizing pulse.

11. Apparatus according to claim 10, further comprising a latch circuit for taking in the output of the counter when the synchronizing pulse is generated and holding the counter output so taken in until the subsequent generation of the synchronizing pulse, wherein said means for comparing comprises means for comparing the output of the latch circuit with the reference value.

* * * * *